US006172768B1

(12) United States Patent
Yamada et al.

(10) Patent No.: US 6,172,768 B1
(45) Date of Patent: Jan. 9, 2001

(54) HALFTONING WITH CHANGEABLE ERROR DIFFUSION WEIGHTS

(75) Inventors: Akitoshi Yamada; Hiromitsu Hirabayashi, both of Irvine, CA (US)

(73) Assignee: Canon Kabushiki Kaisha, Tokyo (JP)

(*) Notice: Under 35 U.S.C. 154(b), the term of this patent shall be extended for 0 days.

(21) Appl. No.: 09/019,310

(22) Filed: Feb. 5, 1998

(51) Int. Cl.$^7$ .............. B41B 15/00; H04N 1/40; G06K 9/36; G06K 9/40
(52) U.S. Cl. .............. 358/1.9; 358/1.1; 358/456; 358/457; 382/251; 382/252; 382/274; 382/275
(58) Field of Search .................. 358/456, 457, 358/459, 298, 534, 536, 1.9, 1.1; 382/252, 251, 237, 274, 275; 395/109, 110

(56) References Cited

U.S. PATENT DOCUMENTS

| | | | |
|---|---|---|---|
| 5,045,952 | * 9/1991 | Eschbach | 358/447 |
| 5,142,374 | 8/1992 | Tajika et al. | 358/298 |
| 5,488,398 | 1/1996 | Matsubara et al. | 347/43 |
| 5,500,661 | 3/1996 | Matsubara et al. | 347/41 |
| 5,617,123 | 4/1997 | Takaoka et al. | 347/15 |
| 5,633,663 | 5/1997 | Matsubara et al. | 347/41 |
| 5,729,259 | 3/1998 | Gotoh et al. | 347/43 |
| 5,737,453 | * 4/1998 | Ostromoukhov | 382/275 |
| 5,911,009 | * 6/1999 | Ikuta | 382/237 |

FOREIGN PATENT DOCUMENTS 808055    11/1997 (EP).

* cited by examiner

*Primary Examiner*—Edward L. Coles
*Assistant Examiner*—Twyler Lamb
(74) *Attorney, Agent, or Firm*—Fitzpatrick, Cella, Harper & Scinto

(57) ABSTRACT

Error diffusion halftoning in which error diffusion coefficients and/or thresholds vary, and preferably vary based on output error or on image source data plus accumulated error. Varying error diffusion coefficients and/or thresholds is observed to reduce printed artifacts. Preferably, a look-up table is provided, which may be based on output error or based on image source data plus accumulated error, and which directly provides error values for diffusion by adding to adjacent pixels, and which further may provide printer output data.

38 Claims, 14 Drawing Sheets

| SOURCE DATA PLUS ACCUMULATED ERROR | ERROR COEFFICIENTS CYCLE | THRESHOLD CYCLE | THRESHOLD |
|---|---|---|---|
| -191 | 1 | 1 | 128 |
| -190 | 2 | 2 | 160 |
| -189 | 3 | 0 | 96 |
| -188 | | | |
| ⋮ | | | |
| 108 | 0 | 0 | 96 |
| 109 | 1 | 1 | 128 |
| 110 | 2 | 2 | 160 |
| 111 | 3 | 0 | 96 |
| 112 | 0 | 1 | 128 |
| 113 | 1 | 2 | 160 |
| ⋮ | | | |
| 444 | 0 | 0 | 96 |
| 445 | 1 | 1 | 128 |
| 446 | 2 | 2 | 160 |
| 447 | 3 | 0 | 96 |

FIG. 14A

| SOURCE DATA PLUS ACCUMULATED ERROR | e0 | e1 | e2 | e3 | er | OUTPUT |
|---|---|---|---|---|---|---|
| -191 | -11 | -21 | -43 | -114 | -2 | 0 |
| -190 | | | | | | 0 |
| -189 | | | | | | 0 |
| ⋮ | | | | | | |
| 180 | | | | | | 1 |
| 109 | 6 | 12 | 24 | 65 | 2 | 0 |
| 110 | 8 | 15 | 30 | 55 | 2 | 0 |
| 111 | -13 | -23 | -47 | -59 | -2 | 1 |
| 112 | 8 | 15 | 30 | 56 | 3 | 0 |
| 113 | | | | | | 0 |
| ⋮ | | | | | | |
| 445 | | | | | | 1 |
| 446 | | | | | | 1 |
| 447 | 18 | 31 | 63 | 79 | 1 | 1 |

FIG. 14B

HALFTONING WITH CHANGEABLE ERROR DIFFUSION WEIGHTS

BACKGROUND OF THE INVENTION

1. Field of the Invention

The present invention relates to halftoning by error diffusion, in which error diffusion weights are changeable and preferably depend on output error or on image source data plus accumulated error.

2. Description of the Related Art

Error diffusion halftoning, as generally described in the seminal works by Floyd, Steinberg and Stucki, has become one of the most popular techniques for producing halftoned image output based on a continuous tone image input. Particularly in connection with computerized images, where each input pixel is represented by an 8-bit gray scale or 24-bit color value, error diffusion halftoning has been found to yield pleasing results in images printed with binary or limited level output printers, such as color ink jet printers and the like. Error diffusion tends to enhance edge sharpness and further tends to preserve fine image detail while yielding an overall pleasing image.

Generally speaking, error diffusion halftoning proceeds in accordance with the following steps. First, image data for a target pixel in the continuous tone image is compared against a threshold (or, in the case of multi-level output devices, against a range of thresholds), so as to determine what output value the image output device should print for the target pixel. For example, in the case of a binary printer (meaning a printer that outputs at each pixel location either a dot or an absence of a dot), the threshold may be one half of the density range, with a pixel being printed if the continuous tone value for the target pixel exceeds one half and with no pixel being printed if the continuous tone value does not exceed one half. Then, the error between the continuous tone input value and the actual output value is calculated. This error is sometimes called the "output error". The output error is diffused to adjacent pixels using predetermined weighting coefficients, so that predesignated proportions of the output error are added to existing continuous tone image values at pixels adjacent the target pixel. Processing then proceeds with another target pixel in a predetermined scan pattern. When it comes time to threshold one of the adjacent pixels so as to determine whether or not to print a dot, the determination is based on the original continuous tone image value plus any accumulated errors.

One problem with error diffusion halftoning is the creation of artifacts in the printed image that tend to degrade overall printed image quality. Two kinds of artifacts have been identified: unexpected continuous dot lines that appear in highlight regions (such as at extremely low and extremely high density regions), and repetitive textures or patterns that appear at mid density regions. These artifacts are illustrated in more detail in connection with FIGS. 1 and 2.

In FIG. 1, 10 represents a printout of standard error diffusion halftoning of an 8×4 grid of patches, with each patch having a constant gray level that increases serially from patch to patch. The 8×4 grid of FIG. 1 includes patches only in the low density gray region and does not include patches of darkness exceeding around ten percent gray. Continuous dot lines are readily apparent, for example, at 11 and 12. These continuous dot line patterns are displeasing to a viewer.

FIG. 2 illustrates a gray level wedge proceeding from a full black density level to a full white density level. At mid density levels, repetitive patterns or texture are readily apparent, such as illustrated at 16. These textures are displeasing to a viewer, and degrade overall printed image quality.

The creation and presence of these artifacts are well-documented, and have been subjected to significant study so as to reduce their appearance and improve overall image quality. One previously-proposed technique is to modify error diffusion weights based on the image input. Examples of such techniques are described in Ostromoukhov, European 808,055; and Eschbach, "Reduction Of Artifacts In Error Diffusion By Means Of Input-Dependent Weights", Journal of Electronic Imaging, October, 1993, pages 352 through 358. Other known techniques, although not necessarily known to reduce artifacts, include techniques that dynamically modify the threshold against which the continuous tone image value plus accumulated error is compared, including modification based on image value, as described for example in Eschbach, "Error-Diffusion Algorithm With Edge Enhancement", Journal of The Optical Society of America, December, 1991, pages 1844 through 1850.

Such techniques are different from the present invention, since in the invention error diffusion weights and/or thresholds are modified based on accumulated output error, or based on image source data and accumulated output error.

SUMMARY OF THE INVENTION

It is an object of the invention to reduce output artifacts in error diffusion halftoning, by modifying error diffusion weights and/or thresholds based on output error, or based on image data and accumulated output error. Preferably, a look-up table is provided which, based on output error or based on image source data plus its accumulated error, directly provides actual error values and/or threshold or output values for error diffusion halftoning.

Thus, in one aspect the invention is error diffusion halftoning of image data for a target pixel in which a halftone output value for the target pixel is determined based on a comparison between a threshold and the image data for the target pixel and accumulated error, and in which error between the halftone output value and the image data and accumulated error for the target pixel is diffused in predetermined proportions to pixels adjacent the target pixel. The predetermined proportions depend at least in part on the value of the error, or depend at least in part on the value of the image data and accumulated error for the target pixel. The threshold may also depend at least in part on the value of the error or on the value of the image data and accumulated error. Preferably, the error diffusion weights depend in a cyclic manner on output error, or on image data plus accumulated error. For example, the error diffusion weights can be selected so as to vary cyclically from a set of coefficients that is neutral, to a set of coefficients that favors error diffusion in a rightward direction, and thence to error diffusion coefficients that favor error diffusion in a lower left hand direction. If thresholds are allowed to very, they also preferably vary cyclically, but with a cycle that is different from that of the error diffusion weights.

Because the error diffusion weights and/or thresholds depend on output error, or on image data and accumulated error, formation of regular patterns, such as continuous dot lines in highlight regions and textures in mid tone regions, is greatly reduced.

In further aspects, the invention is error diffusion halftoning that obtains access to a look-up table that stores pre-calculated error diffusion amounts, with the pre-calculated error diffusion amounts being accessible from the look-up table based on input data and accumulated error. Error diffusion values in the look-up table are pre-calculated based on error diffusion coefficients that vary based at least in part on the image data and accumulated error. Preferably, variation is cyclical, for example, varying between neutral values and values that favor error diffusion in a rightward direction and values that favor error diffusion in a downward left direction. Error diffusion using the look-up table proceeds by determining a halftone output value for a target pixel based on a comparison between a threshold and image data and accumulated error for the target pixel. The look-up table is accessed using the image data and accumulated error so as to obtain error diffusion amounts. The error diffusion amounts are added to adjacent pixels. Preferably, the look-up table can also include the halftone output value, thereby avoiding the need for a direct comparison between a threshold and image data plus accumulated error for the target pixel. The threshold can vary, preferably cyclically, based on image data and accumulated error. Most preferably, the cycle for variation of the threshold differs from that of the error diffusion coefficients.

In further aspects, the invention is error diffusion halftoning by access to a look-up table which stores error diffusion amounts and/or thresholds that are accessed in the look-up table by reference to output error. The error diffusion amounts in the look-up table are pre-calculated using error diffusion coefficients that vary based at least in part on output error. For example, variation may be cyclical, changing from error diffusion coefficients that are neutral, to error diffusion coefficients that favor error diffusion in a rightward direction, and to error diffusion coefficients that favor error diffusion in a downward left direction. Likewise, error diffusion thresholds in the look-up table are pre-calculated to vary based at least in part on output error. Error diffusion halftoning according to the invention proceeds by determining a halftone output value for a target pixel based on a comparison between a threshold and image data plus accumulated error for the target pixel. Output error is calculated based on the difference between the halftone output value and the image data plus accumulated error for the target pixel. Using the output error, the look-up table is accessed so as to obtain error diffusion amounts for adjacent pixels. The error diffusion amounts are added to adjacent pixels.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 14A and 14B are views for explaining a look-up table in accordance with the fifth embodiment.

DETAILED DESCRIPTION OF THE PREFERRED EMBODIMENTS

Figure 1:
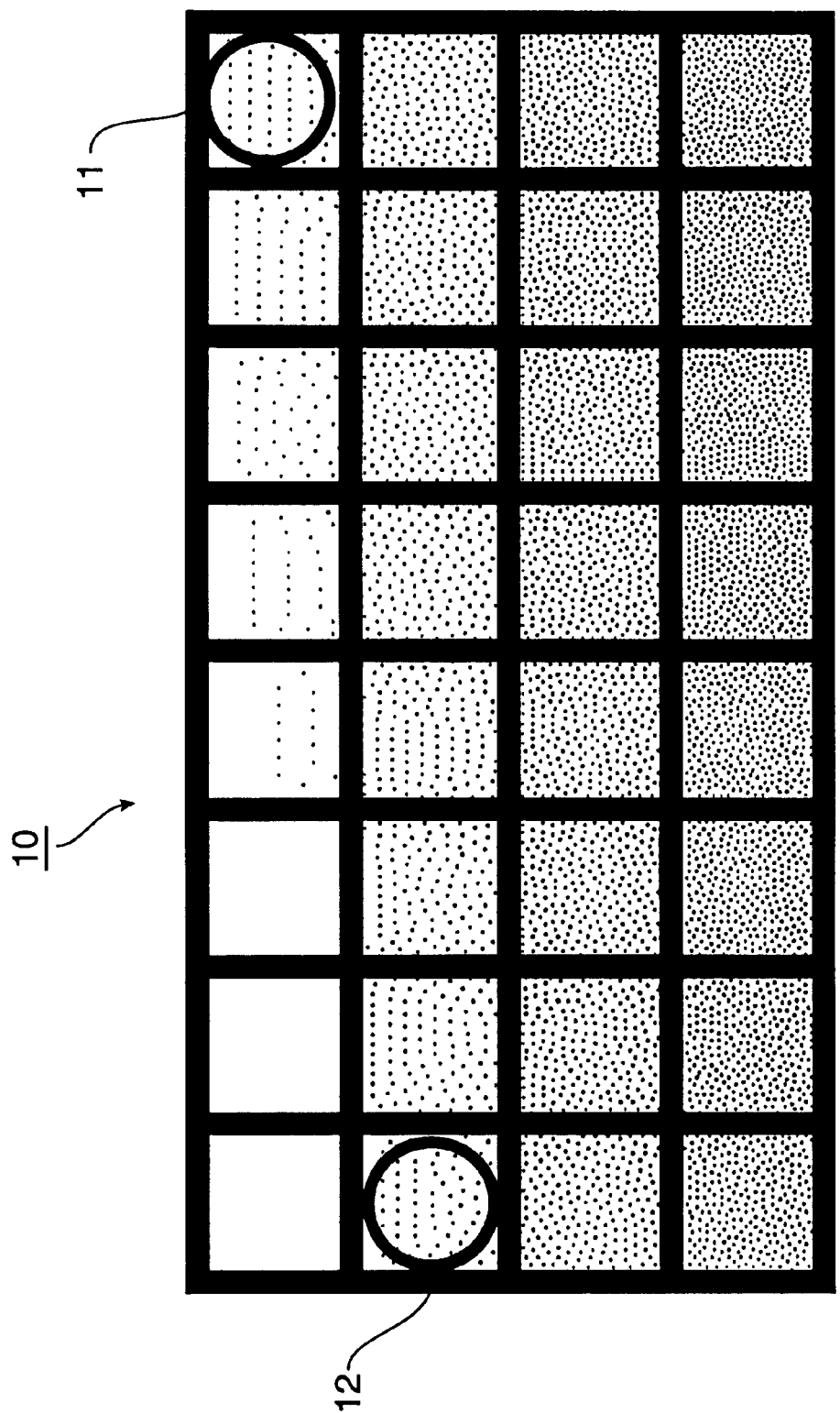
FIGS. 1 and 2 are examples of prior art printed output by error diffusion halftoning, showing undesirable printed artifacts.
Figure 2:
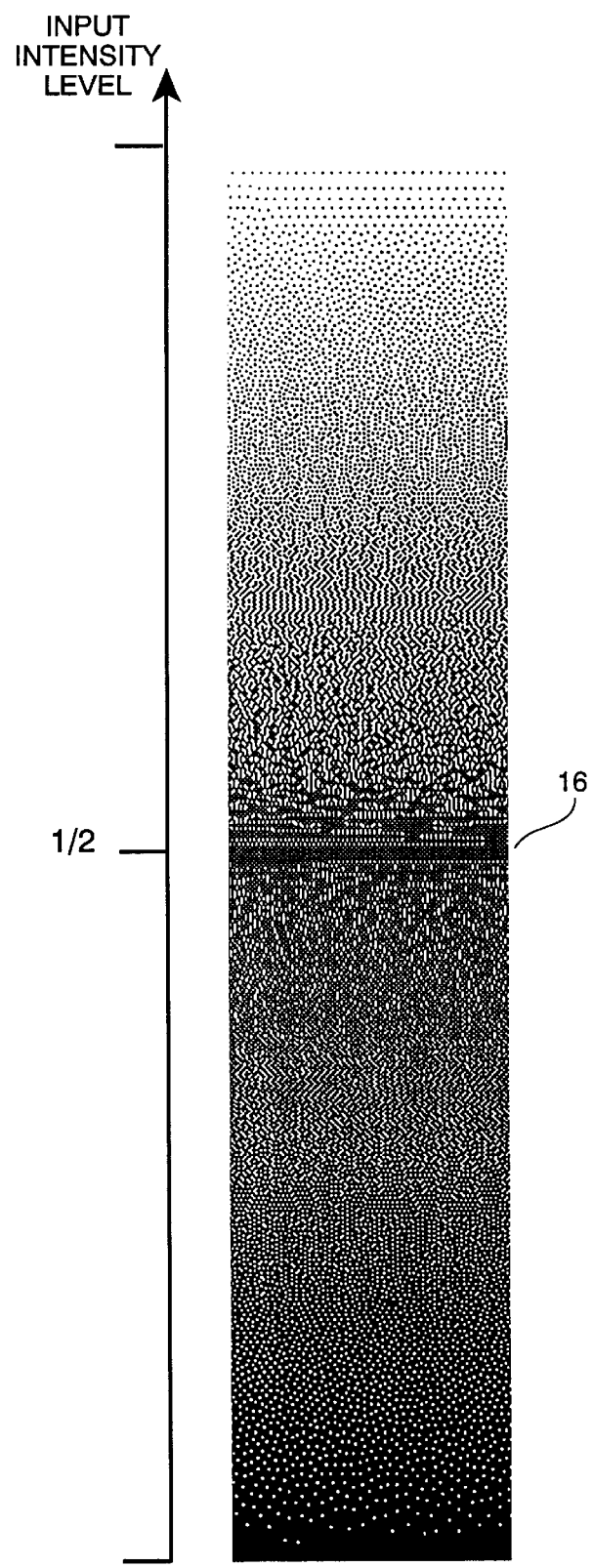
Figure 3:
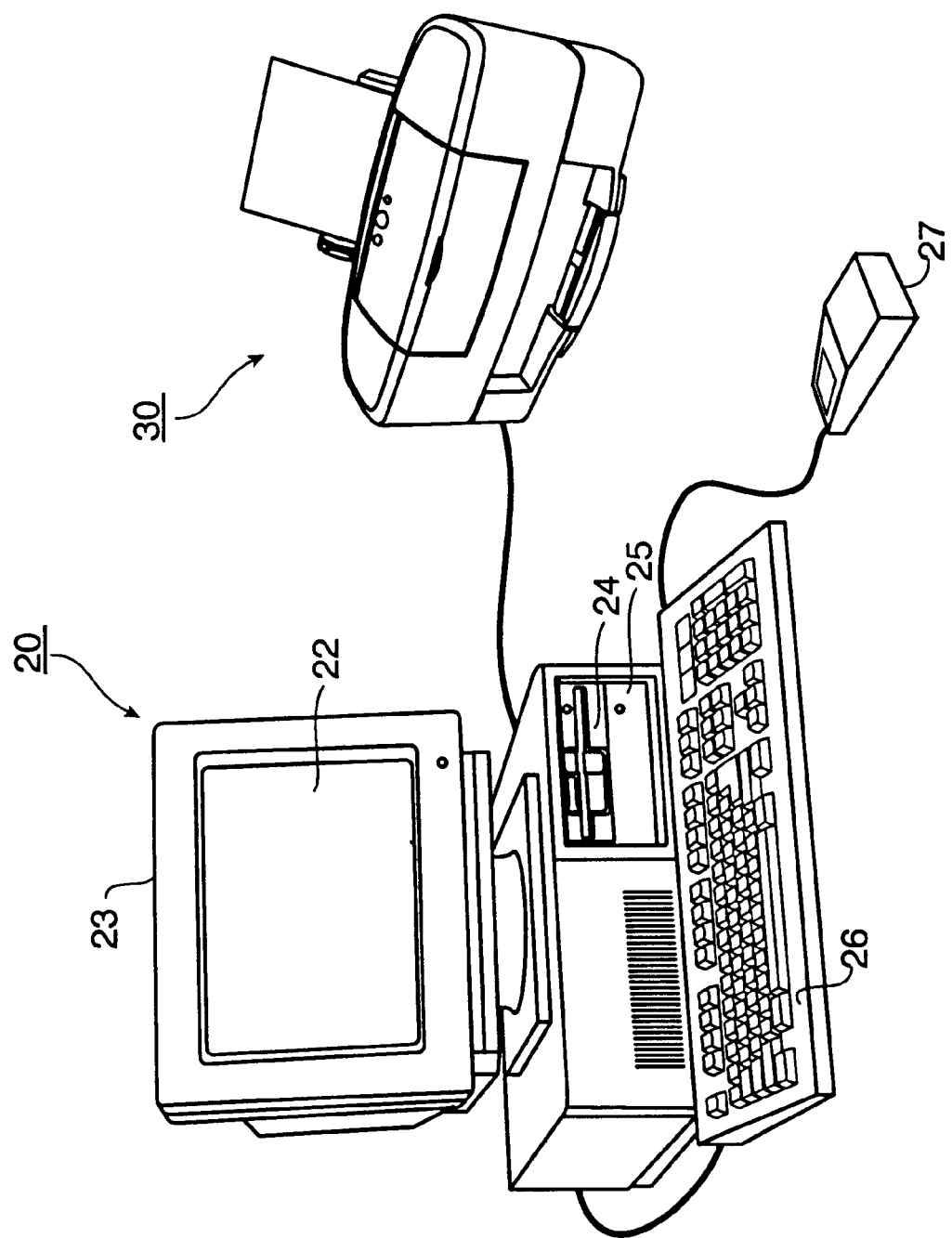
FIG. 3 is a perspective view of computing equipment and a printer used in connection with the present invention.

FIG. 3 is a view showing the outward appearance of computing equipment used in connection with the practice of the invention. Computing equipment 20 includes host processor 23. Host processor 23 comprises a personal computer (hereinafter "PC"), preferably an IBM PC-compatible computer having a windowing environment, such as MicroSoft Windows 95. Provided with computing equipment 20 are display screen 22 comprising a color monitor or the like, keyboard 26 for entering text data and user commands, and pointing device 27. Pointing device 27 preferably comprises a mouse for pointing and for manipulating objects displayed on display screen 22.

Computing equipment 20 includes a computer readable memory medium such as computer disk 25 and floppy disk drive 24. Floppy disk drive 24 provides a means whereby computing equipment 20 can access information, such as data, application programs, etc., stored on floppy disks. A similar CD-ROM interface (not shown) is provided for computer equipment 20, through which computing equipment 20 can access information stored on CD ROM.

Disk 25 is one example of a computer readable medium that stores program instruction sequences executable by CPU 100 so as to constitute operating system 111, application programs 112, printer driver 114, and other application programs, files, and device drivers such as driver 119. Application programs are programs by which host processor 23 generates files, manipulates and stores those files on disk 25, presents data in those files to a user via display screen 22, and prints data via printer 30. Disk 25 also stores an operating system which, as noted above, is preferably a windowing operating system such as Windows® 95. Device drivers are also stored on disk 25. At least one of the device drivers comprises a printer driver 114 which provides a software interface to printer 30. Data exchanged between host processor 23 and printer 30 is effected by the printer driver, as described in more detail below.

Printer 30 is preferably a color ink jet printer which forms images by ejecting droplets of ink onto a recording medium such as paper or transparencies or the like. One suitable printer is described in application Ser. No. 08/972,113, "Multi-Head Printing With Differing Resolutions", the contents of which are incorporated by reference as if set forth in full herein. As used in the practice of the invention, however, printer 30 may be comprised by any other type of printer that forms images on a recording medium through placement of dots having one or more gradation levels, such as a laser beam printer, a thermal printer, a dot matrix printer, or multi-head ink jet printers.

Figure 4:
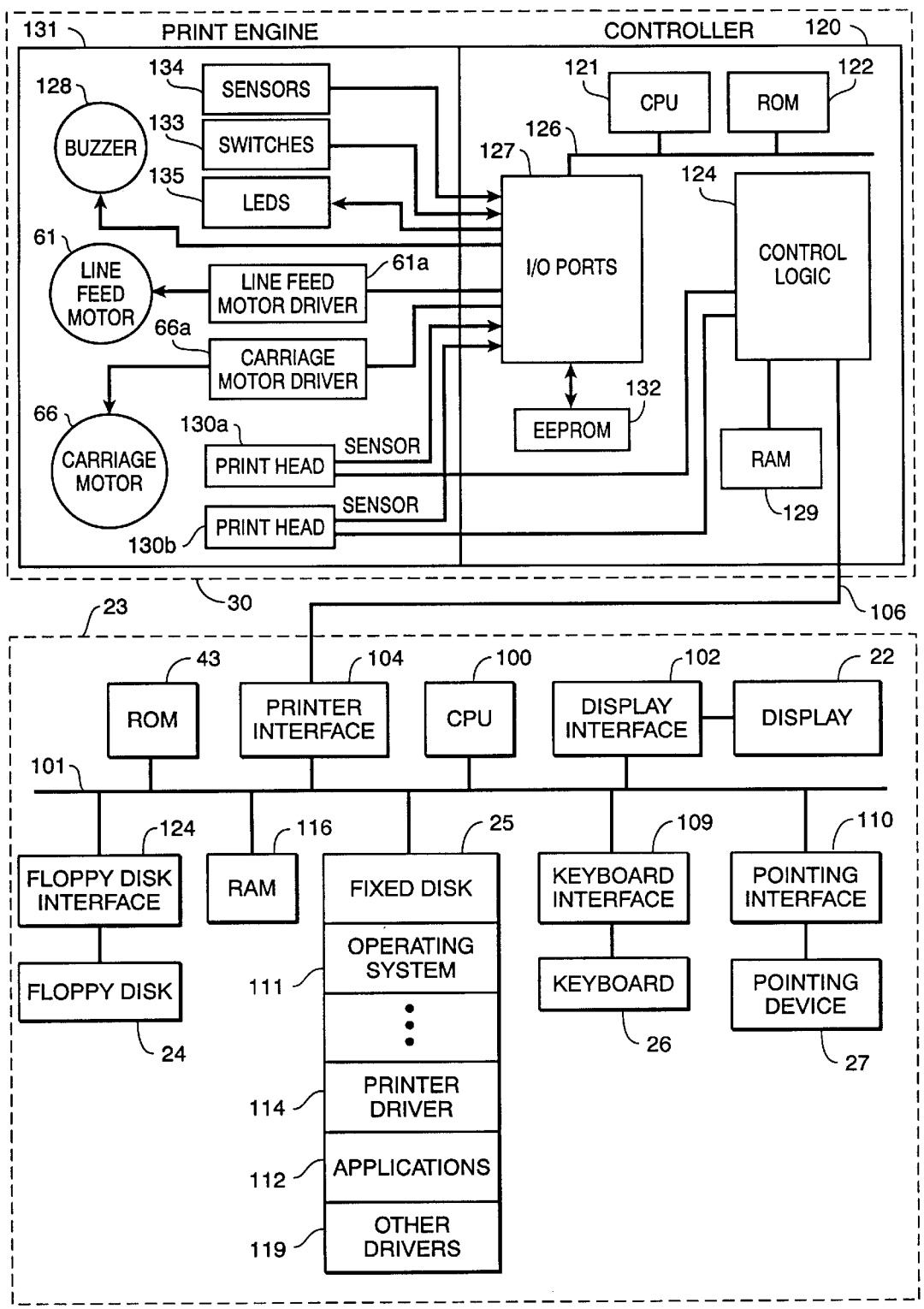
FIG. 4 is a detailed block diagram shown the hardware configuration of a host processor interfaced to the printer of FIG. 3.

FIG. 4 is a block diagram showing the internal structures of host processor 23 and printer 30. In FIG. 4, host processor 23 includes a central processing unit 100 such as programmable microprocessor interfaced to computer bus 101. Also coupled to computer bus 101 are display interface 102 for interfacing to display 22, printer interface 104 for interfacing to printer 30 through a bi-directional communication line 106, floppy disk interface 124 for interfacing to floppy disk drive 24, keyboard interface 109 for interfacing to keyboard 26, and pointing device interface 110 for interfacing to pointing device 27.

A random access main memory (hereinafter "RAM") 116 interfaces to computer bus 101 to provide CPU 100 with access to memory storage. In particular, when executing stored program instruction sequences such as those associated with printer driver 114, CPU 100 loads those instruction sequences from disk 25 (or other storage media such as computer-readable media accessed via a network interface) into RAM 116 and executes those stored program instruction sequences out of RAM 116. It should also be recognized that standard disk-swapping techniques available under windowing operating systems allow segments of memory to be swapped on and off disk 25 to RAM 116.

Read only memory (hereinafter "ROM") 43 in host processor 23 stores invariant instruction sequences, such as start-up instruction sequences or basic input/output operating system (BIOS) sequences for operation of keyboard 26.

Disk 25 may also store color image files such as might be displayed by display 22 or printed by printer 30 under control of specific application programs. Such color image files, which might also be generated dynamically during the execution of application programs, store or encode color image data for each pixel of a color image. One popular storage or encoding format is storage of a red, green and blue (RGB) color primary value for each pixel of the color image, with each of the R, G and B components being represented by an 8-bit byte. A resulting color image stored or encoded in this format provides the ability to represent each pixel of a color image by any one of $2^8 \times 2^8 \times 2^8 = 16.7$ million different colors. Such a format is sometimes called "true color" or "24-bit color". To print such an image, each pixel of the image is generally converted to a value for each of four primaries, such as cyan, magenta, yellow and black (CMYK). However, at each pixel, printer 30 can only print one density gradation (in the case of a binary printer) or a few density gradations (in the case of a multi-gradation printer), for each of the C, M, Y and K color planes. It is the purpose of halftoning according to the invention to convert the multi-level image data stored in computer 20 into appropriate output values for printer 30.

Referring again to FIG. 4, printer 30 includes print controller 120 and print engine 131. Print controller 120 contains computerized and electronic devices used to control print engine 131, and print engine 131 includes physical devices such as carriage and line feed motors together with a print carriage and print heads for obtaining printed output. As shown in FIG. 4, print controller 120 includes CPU 121 such as an 8-bit or a 16-bit microprocessor, ROM 122, control logic 124, and I/O ports 127 connected to bus 126. Also connected to control logic 124 is RAM 129. Connected to I/O ports 127 is EEPROM 132.

Print engine 131 includes line feed motor 61 controlled by line feed motor driver 61a, and carriage motor 66 controlled by carriage motor driver 66a. Dual print heads 130a and 130b are removable print heads carried on an unshown printer carriage, and include ink ejection nozzles for forming a printed image on a recording medium, as well as sensors to provide feedback as to presence and nature of the removable print heads. Also provided in print engine 131 are audible buzzer 128, cover sensors 134, user-actuatable switches 133, and indication LEDs 135.

Control logic 124 provides control signals for nozzles in print heads 130a and 130b, and further provides control logic for line feed motor driver 61a and carriage motor driver 66a, via I/O port 127. I/O port 127 receives sensor output from print heads 130a and 130b, sensor output from sensors 134 and switches 133, and in addition provides control signals for buzzer 128 and LEDs 135. As noted above, I/O ports 127 channel control signals from control logic 124 to line feed motor driver 61a and carriage motor driver 66a.

ROM 122 stores font data, program instruction sequences used to control printer 30, and other invariant data for printer operation. RAM 129 stores print data in a print buffer defined by the program instruction sequences in ROM 122, for printout by print heads 130a and 130b. EEPROM 132 provides non-volatile re-programmable memory for printer information such as print head configuration and print head alignment parameters. EEPROM 132 also stores parameters that identify the printer, the printer driver, the print heads, alignment of the printheads, status of the ink in ink cartridges, etc., all of which may be provided to print driver 114 in host processor 23 so as to inform host processor 23 of operational parameters of printer 30, and so as to allow print driver 114 to change print output so as to accommodate various configurations of printer 30.

Figure 5:
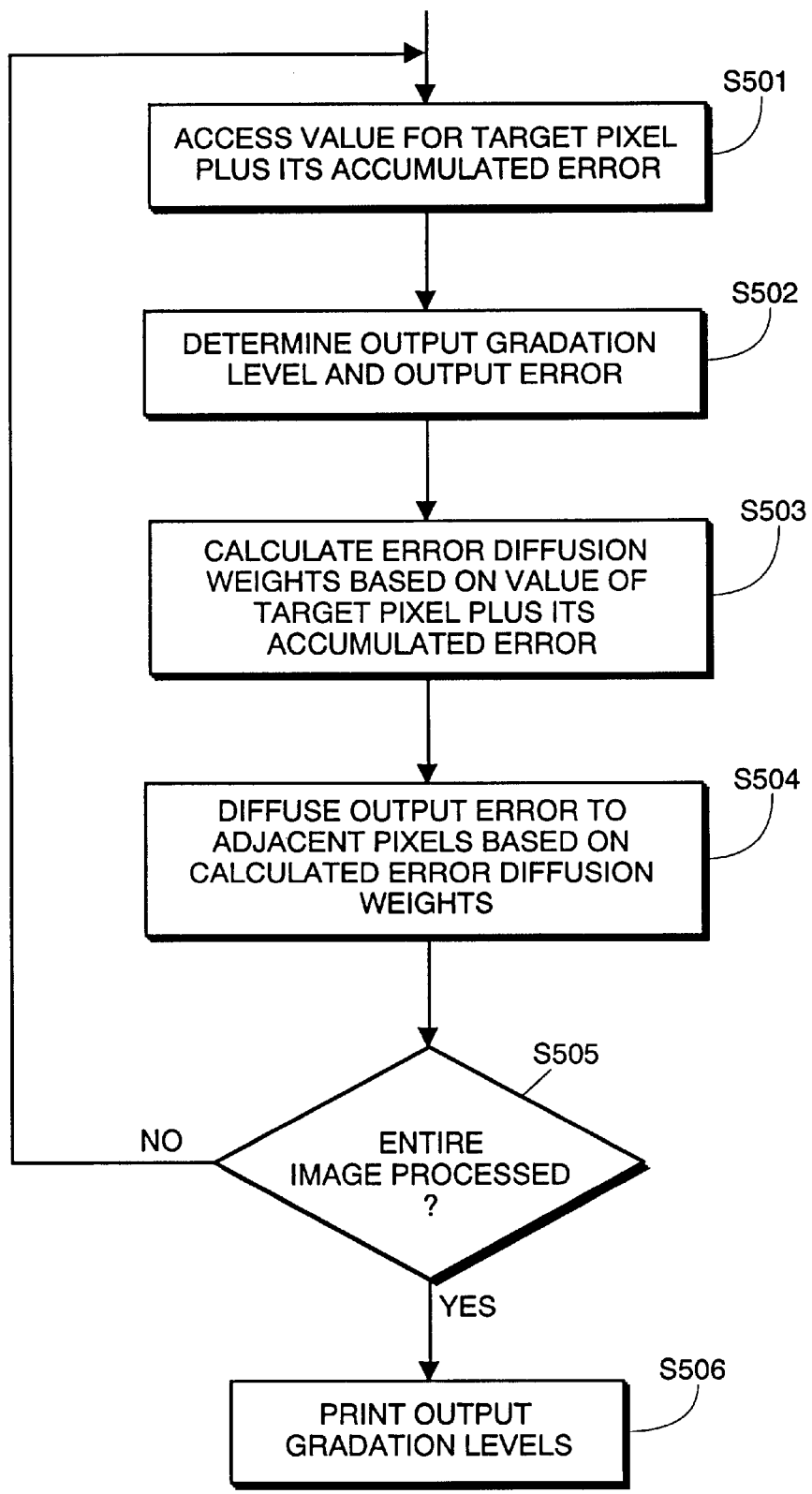
FIG. 5 is a flow diagram illustrating process steps according to a first embodiment of the invention.

FIG. 5 is a flow diagram illustrating computer-executable stored program instruction sequences constituting error diffusion halftoning according to one embodiment of the invention. The process steps shown in this first embodiment, as well as those of the remaining embodiments, are preferably stored in printer driver 114 on disk 25, and are executed by CPU 100 so as to provide halftoned printer output data, which are transmitted from host processor 23 to printer 30 via bi-directional interface 106. The reason why it is preferable to perform error diffusion halftoning in host processor 23 rather than printer 30 is that host processor 23 generally includes more processing power than printer 30. Accordingly, the stored program instruction sequences shown in FIG. 5 can be executed more quickly by host processor 23 than by printer 30, in the conversion of multi-level image input data to printed output data. Of course, it should be recognized that in certain circumstances it may be preferable for the stored program instruction sequences to be executed by printer 30, in which case the stored program instruction sequences shown in FIG. 5 may be stored in ROM 122 and executed by CPU 121.

The FIG. 5 embodiment, like all the embodiments described here, presupposes a uniform left-to-right processing of each pixel in each raster line. However, all embodiments can be modified so as to account for different processing orders, such as serpentine or blue-noise ordering, simply by altering the direction in which error is diffused.

Generally speaking, the stored program instruction sequences illustrated in FIG. 5 comprise error diffusion halftoning by which multi-level image data is converted into printer output data. A value for a target pixel plus its accumulated error is accessed, an output gradation level is determined based on a comparison between a threshold and the target pixel plus its accumulated error, an output error is calculated, and the output error is diffused to adjacent pixels. Diffusion to adjacent pixel is based on calculated error diffusion weights, which in turn depend on the value of the target pixel plus its accumulated error.

In more detail, step S501 commences error diffusion processing for a target pixel by accessing the value for the target pixel plus its accumulated error. "Accumulated error" means error that has accumulated from prior error diffusion processing for other pixels, such as through previous error diffusion processing for a pixel adjacent the target pixel. In this regard, it is generally preferable in the practice of the invention for the input image data, or a portion thereof, which is loaded into a memory buffer, to be halftoned processed in situ, meaning that as errors are calculated they are diffused by adding directly to original image values. Accordingly in situ processing can result in lower memory requirements, since there is no need to store separate buffers for the original image data as well as accumulated errors.

Step S502 determines output gradation level and output error for the target pixel. To determine output gradation level, a comparison is made between a threshold and the value plus accumulated error for the target pixel. The threshold may be constant, such as one half of the range of the multi-level image data (in the case of 8-bit image data, a fixed threshold of 127 may be selected). Alternatively, the threshold may be variable. Specifically, the threshold can vary based on location of the target pixel in the raster grid of the image data, or the threshold may vary based on the image data value of the target pixel, or a combination thereof.

Output error in step S502 is determined by obtaining the difference between the desired output value (as represented by the value plus accumulated error for the target pixel) and the actual printed value. For example, if image data plus accumulated error for the target pixel indicates that a desired output value is one quarter of the density range, then for a binary printer it is likely that an output gradation level of zero will be selected. In this instance, then the output error is one quarter, which represents the difference between the image value plus accumulated error for the target pixel and the actually selected output value for the target pixel.

In step S503, error diffusion weights are calculated for subsequent use in diffusing the output error to pixels adjacent the target pixel. In the practice of the invention, the error diffusion weights are calculated based on the value of the target pixel plus its accumulated error. This is illustrated in FIGS. 6A through 6C.

Figure 6A:
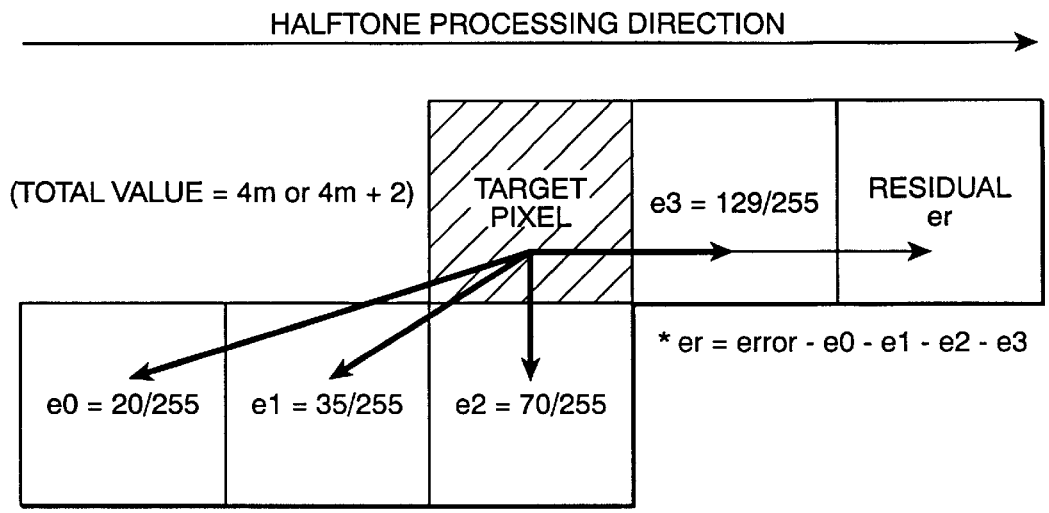
FIGS. 6A through 6C are views showing error diffusion coefficients that are changeable based on output error or based on image data plus accumulated error.

Specifically, FIG. 6A shows error diffusion weights for a target pixel. The error diffusion weights are labeled e0, e1, e2, e3 and er. As shown in FIG. 6A, the largest proportion of error is diffused to a pixel directly adjacent and to the right of the target pixel, as labeled by error e3=129÷255. The next largest proportion of error is diffused to a pixel directly adjacent and below the target pixel at error weight e2=70÷255. successively smaller proportions of error are diffused to pixels adjacent and to the lower left of the target pixel, as shown at weights e1=35÷255 and e0=20÷255. Finally, so as to account for rounding error and the effects of integer calculation, any residual error is diffused to the next adjacent rightward pixel as shown at er=total output error-e0-e1-e2-e3.

The error diffusion weight shown in FIG. 6A are neutral error diffusion weights and are used when the value of a target pixel plus its accumulated error is equal to 4 m or 4 m+2, where m is any integer. Thus, in step S503, if the value of a target pixel plus its accumulated error is equal to 4 m or 4 m+2, then error diffusion weight shown in FIG. 6A are calculated.

Figure 6B:
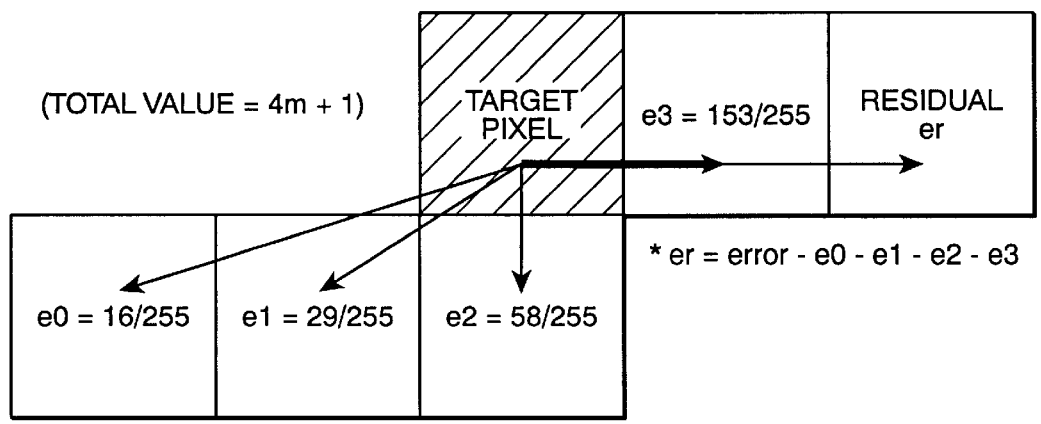
Figure 6C:
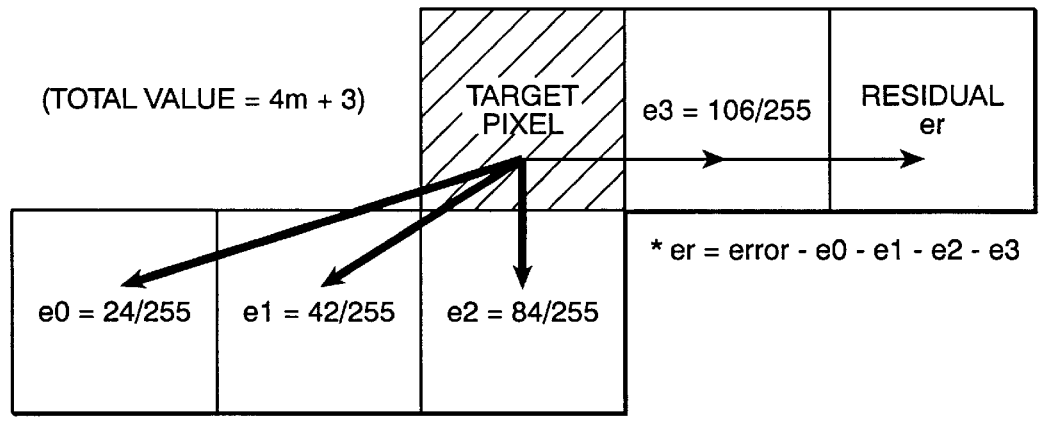

On the other hand, if the value for a target pixel plus its accumulated error is equal to 4 m+1, then the error diffusion weights shown in FIG. 6B are calculated. The error diffusion weights of FIG. 6B favor the right-hand adjacent pixels, and are obtained by increasing the value for e3 by twenty percent while decreasing the values for e0, e1 and e2 by twenty percent, approximately.

FIG. 6C shows error diffusion weights that are calculated in the event that the value for the target pixel plus its accumulated error is equal to 4 m+3. The error diffusion weights shown in FIG. 6C favor the left-downward direction and are obtained by increasing the error diffusion weights shown in FIG. 6A for e0, e1 and e2 by twenty percent, while decreasing the error diffusion weight shown for e3 by twenty percent, approximately.

Figure 7:
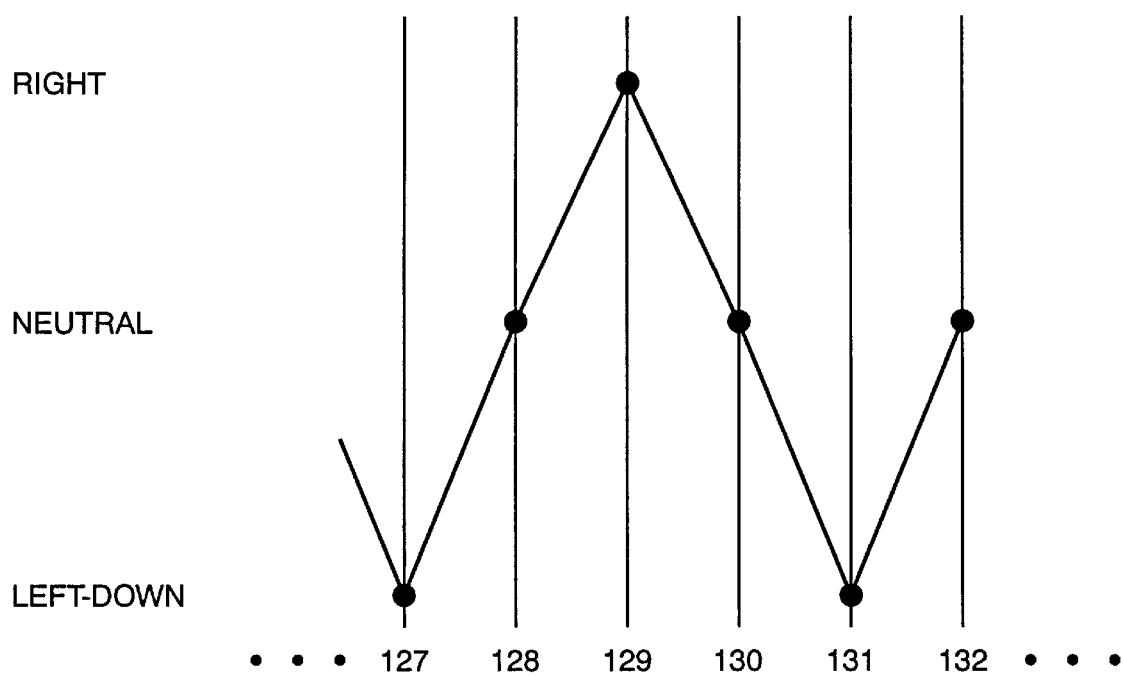
FIG. 7 is a view for explaining cyclic variation of error diffusion coefficients.

By calculating error diffusion weights in the manner illustrated in FIGS. 6A through 6C, a cyclical variation in error diffusion weights is obtained, as shown in FIG. 7. specifically, FIG. 7 illustrates how error diffusion weights vary based on the value of the target pixel plus its accumulated error. As seen from FIG. 7, a cyclic variation is obtained, having a period of four, which varies from favoring a left-downward direction (as shown in FIG. 6C), through a neutral direction (as shown in FIG. 6A), to a rightward direction (as shown in FIG. 6B) and so on. Such cyclical variation in error diffusion weights, in dependence on image value plus its accumulated error, is preferred.

Reverting to FIG. 5, step S504 diffuses output error to adjacent pixels based on the calculated error diffusion weights. Specifically, based on the error diffusion weights calculated in step S503, the output error is apportioned to adjacent pixels in the manner depicted in FIGS. 6A through 6C. Then, step S505 determines whether the entire image has been processed, or a sufficient portion thereof such as one printed band has been processed. If the entire image, or sufficient portion thereof, has not yet been processed, then step S505 returns flow to step S501, so as to continue error diffusion processing for another target pixel in a predetermined scan pattern. On the other hand, if the entire image has been processed, or a sufficient portion thereof such as one band has been processed, then step S505 advances flow to step S506. Step s506 causes the output gradation levels to be transmitted from host processor 23 over bi-directional interface 106 to printer 30 for printout thereby.

Figure 8:
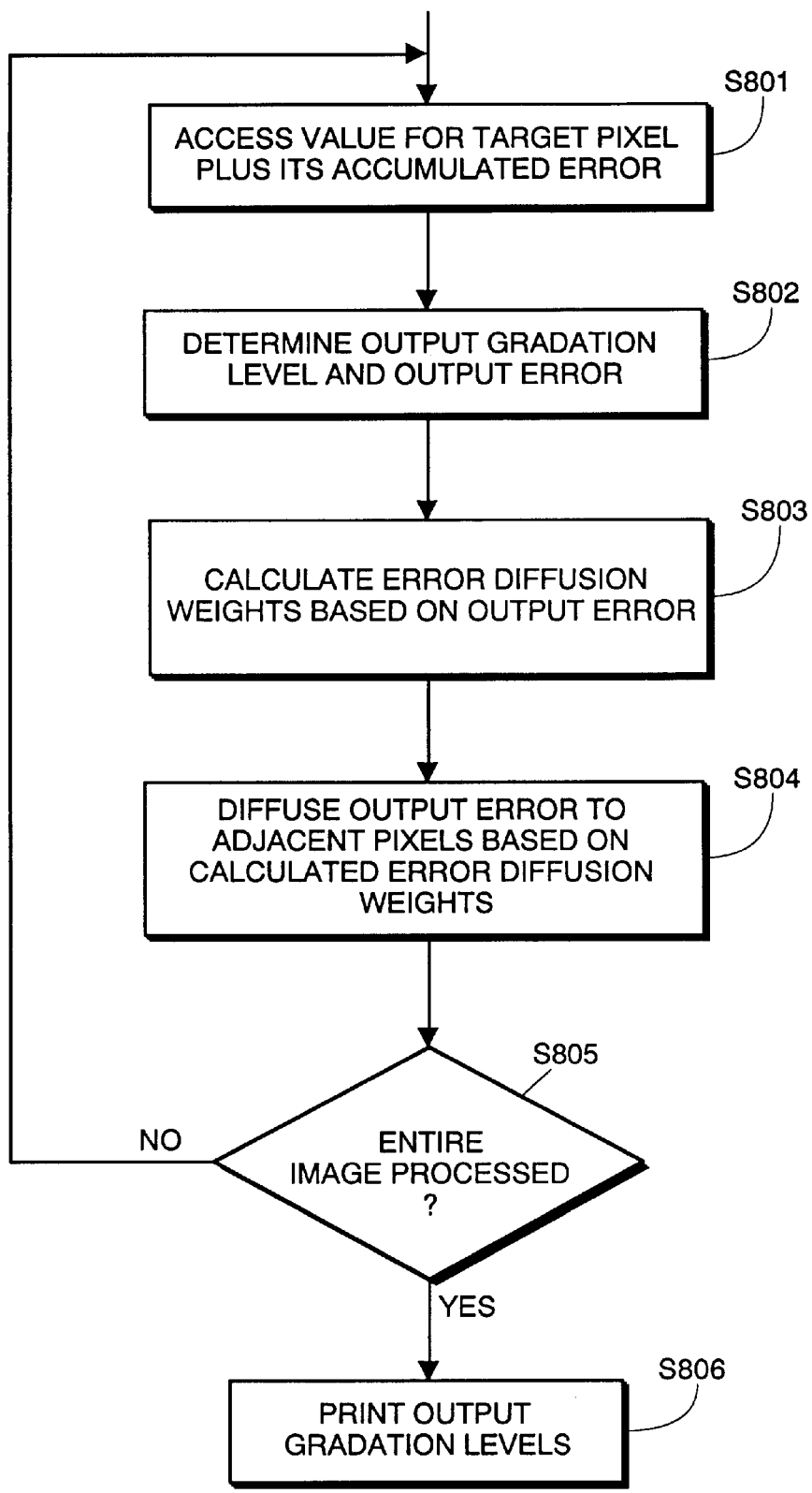
FIG. 8 is a flow diagram illustrating process steps for a second embodiment of the invention.

FIG. 8 illustrates a second embodiment of the invention. One way that the embodiment of FIG. 8 differs from the first embodiment is that error diffusion weights are calculated based on output error, rather than based on the value of a target pixel plus its accumulated error.

The process steps shown in FIG. 8 are stored in printer driver 114 on disk 125, and executed by CPU 100 so as to provide print data to printer 30 of bi-direction bus 106. However, as described above, it is possible for the process steps shown in FIG. 8 to be stored in ROM 122 and executed by CPU 121 in printer 30.

Steps S801 and S802 are similar to corresponding steps in FIG. 6, and provide access to a value for a target pixel plus its accumulated error, and a determination of output gradation level together with output error.

In step S803, error diffusion weights are calculated, with the calculations being based on the output error. Suitable error diffusion weights are shown in FIGS. 6A through 6C.

In step S804, output error is diffused to adjacent pixels based on the calculated error diffusion weights. If the entire image, or a sufficient portion thereof such as one band, has not yet been processed, step S805 returns processing to step S801. On the other hand, if the entire image or a sufficient portion thereof has been processed, then flow proceeds to step S806 in which the print output data is transmitted to printer 30 for printout thereby.

Figure 9:
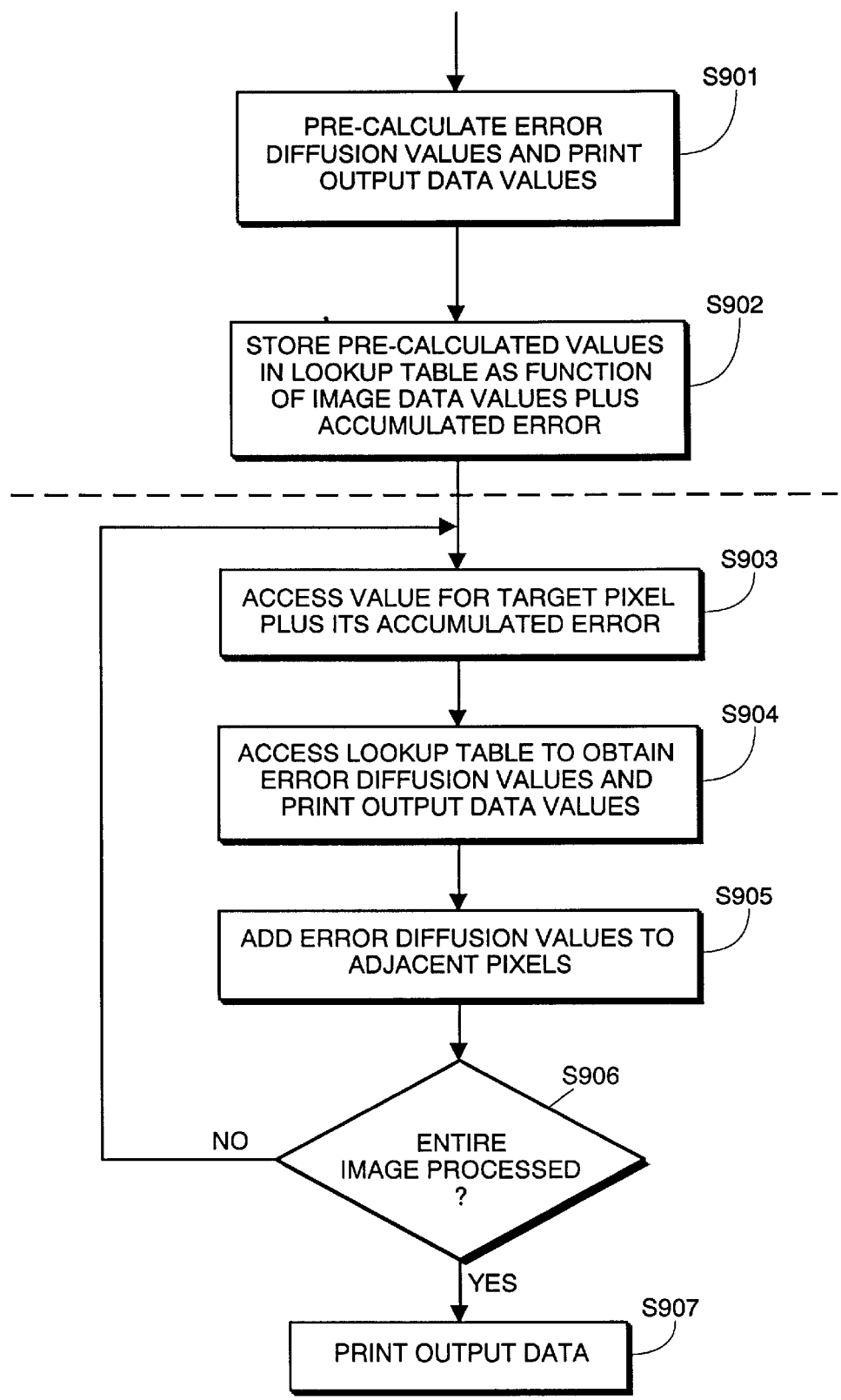
FIG. 9 a flow diagram illustrating process steps according to a third embodiment of the invention.

FIG. 9 illustrates a third embodiment of the invention. One way the third embodiment differs from prior embodiments is that a look-up table is used to store pre-calculated error diffusion parameters. In the embodiment of FIG. 9, what is stored in the look-up table is actual error diffusion values, rather than error diffusion weights. Storing actual error diffusion values rather than error diffusion weights eliminates the need for a multiplication to multiply the output error by the error diffusion weight so as to obtain the error diffusion value.

In the third embodiment, pre-calculation of error diffusion values, and storage thereof in a look-up table, is logically distinct from use of the look-up table during error diffusion processing. A dashed line has been inserted in FIG. 9 to emphasize this distinction. It is preferred that pre-calculation and storage of the look-up table be completed well in advance of use of the look-up table, for example, during design of printer driver 114 so that printer driver 114 is shipped to end users with appropriate look-up tables pre-stored therein. Alternatively, it is possible for printer driver 114 to calculate and store a look-up table dynamically in advance of printing, so as to accommodate particular image characteristics that might lessen or increase the need for variable error diffusion values.

Generally speaking, the process steps shown in FIG. 9 provide for error diffusion halftoning through access to a look-up table that stores pre-calculated error diffusion values as a function of image data values plus accumulated error. To halftone-process a target pixel, its value plus accumulated error is utilized to access the look-up table, thereby to obtain error diffusion values. Preferably, the look-up table also provides printed output value; but if the look-up table does not the printed output value may be obtained by comparison of the value of the target pixel plus its accumulated error to some threshold. Error diffusion values obtained from the look-up table are thereafter added to adjacent pixels, for subsequent processing when the adjacent pixels become the target pixel.

In more detail, step S901 precalculates error diffusion values together with print output data values. The error diffusion values and the print output data values are both calculated based on all possible values of image source data plus accumulated error. Thus, even though 8-bit image data is constrained to lie within the range of 0 through 255, the process of error accumulation might result in as much as 20 percent more than 127 being subtracted from original image data, or up to 20 percent more than 128 being added to original image data. (The "20 percent" factor is a worst case estimate based on the fact that this embodiment increases errors cyclically by 20 percent.) Accordingly, since original image data lies in the range 0 through 255, error diffusion values and print output data values are calculated for each possible value of image source data plus accumulated error in the range of −153 through 409.

Figure 10:
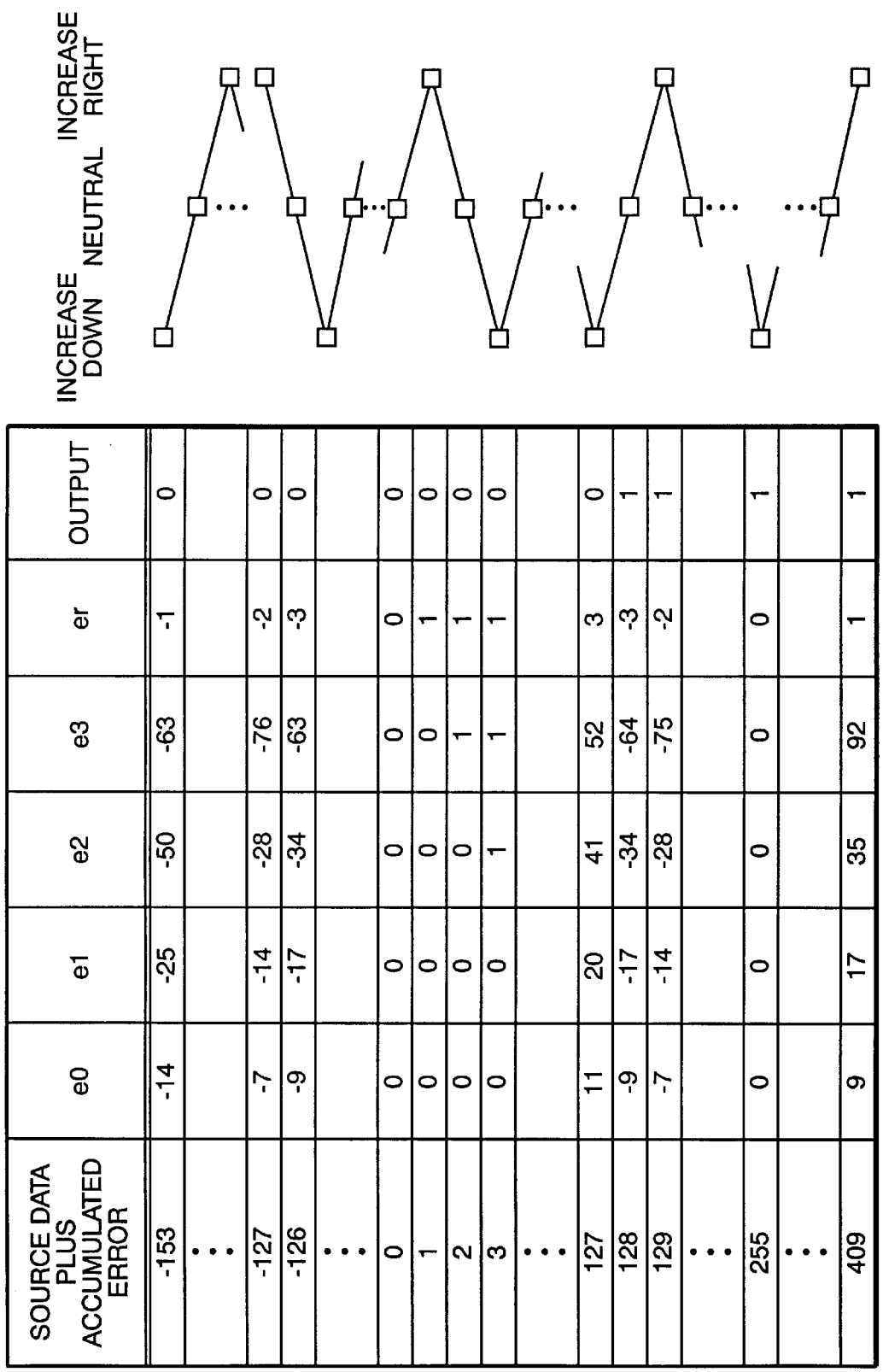
FIG. 10 is a view for explaining a look-up table according to one embodiment of the invention.

Steps S902 stores the precalculated values in a look-up table as a function of image data values plus accumulated error. FIG. 10 illustrates a representative example of such a look-up table.

Referring to FIG. 10, for each value of image source data plus accumulated error in the range of −153 through 409, error diffusion values e0, e1, e2, e3 and er are stored together with a print output data value. The proportions used to obtain the error diffusion values depend on the source data plus accumulated error, as explained above in connection with FIGS. 6A through 6C. Preferably, the weights used to obtain the error diffusion values vary cyclically, as further explained in connection with FIGS. 6A through 6C.

For purposes of illustrating how steps S901 and S902 pre-calculate and store a look-up table, consider the situation presented when source image data plus its accumulated error is equal to −126, as shown in FIG. 10. In such circumstances, the print output data value is calculated to be zero, resulting in an output error of −126−0=−126. Since the source plus accumulated error of −126 is in the form 4 m+2, the error coefficients shown in FIG. 6A are utilized to diffuse the output error of −126. Applying the weights shown in FIG. 6A to the output error of −126 yields the error diffusion values e1 through er shown in FIG. 10.

In like manner, error diffusion values and print output data values are pre-calculated and stored in a look-up table for each possible value of source image data plus accumulated error, with the proportion of output error diffused to adjacent pixels varying, and preferably varying cyclically, based on source image data plus accumulated error.

Reverting to FIG. 9, step S903 accesses a value for a target pixel plus its accumulated error. Step S904 accesses the look-up table so as to obtain error diffusion values and print output data values. Step S905 adds error diffusion values to adjacent pixels. If all image data, or a sufficient portion thereof, has not yet been processed, then step S906 returns processing to step S903, until a sufficient portion (such as a band) of the image data has been processed. When a sufficient portion of the image data has been processed, then step S907 causes the print output data values to be transmitted from host processor 23 over bi-directional interface 106 to printer 30 for print out thereby.

Figure 11:
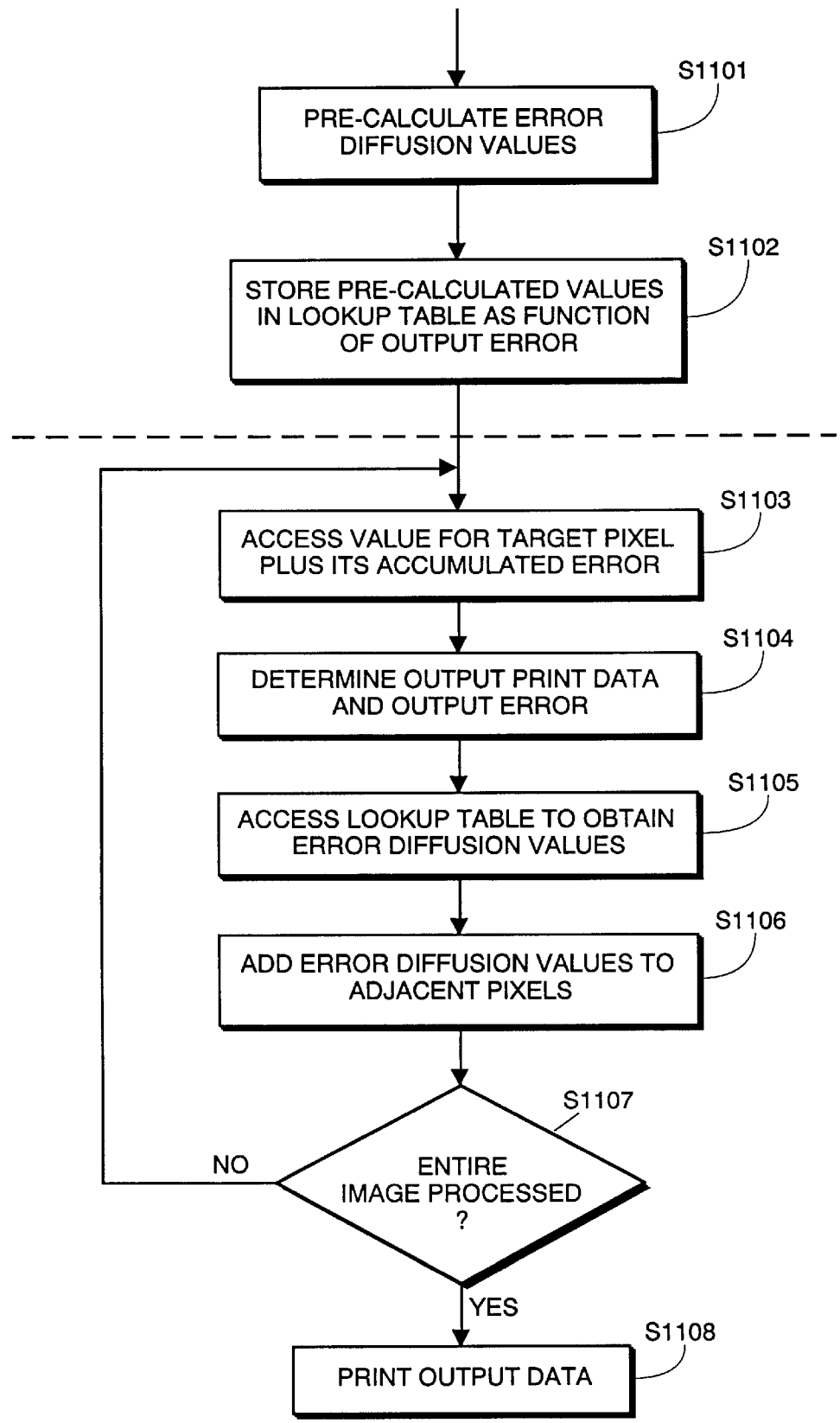
FIG. 11 is a flow diagram illustrating process steps according to a fourth embodiment of the invention.

FIG. 11 illustrates process steps according to a fourth embodiment of the invention. One way that the fourth embodiment differs from the third embodiment is that the look-up table stores error diffusion values as a function of output error, rather than as a function of source image data plus accumulated error. In addition, error diffusion proportions are varied, and preferably varied cyclically, based on output error rather than based on source image data plus accumulated error.

Thus, step S1101 precalculates error diffusion values for each possible value of output error, which in this case lies in a range between −127 and 128 increased by 20 percent, or −153 to 154. The error diffusion values are based on error diffusion coefficients which vary, and preferably vary cyclically, based on output error.

Step S1102 stores the pre-calculated values in a look-up table, with the pre-calculated values accessible as a function of output error. An illustrative example of a look-up table according to step S1102 is shown in FIG. 12.

Figure 12:
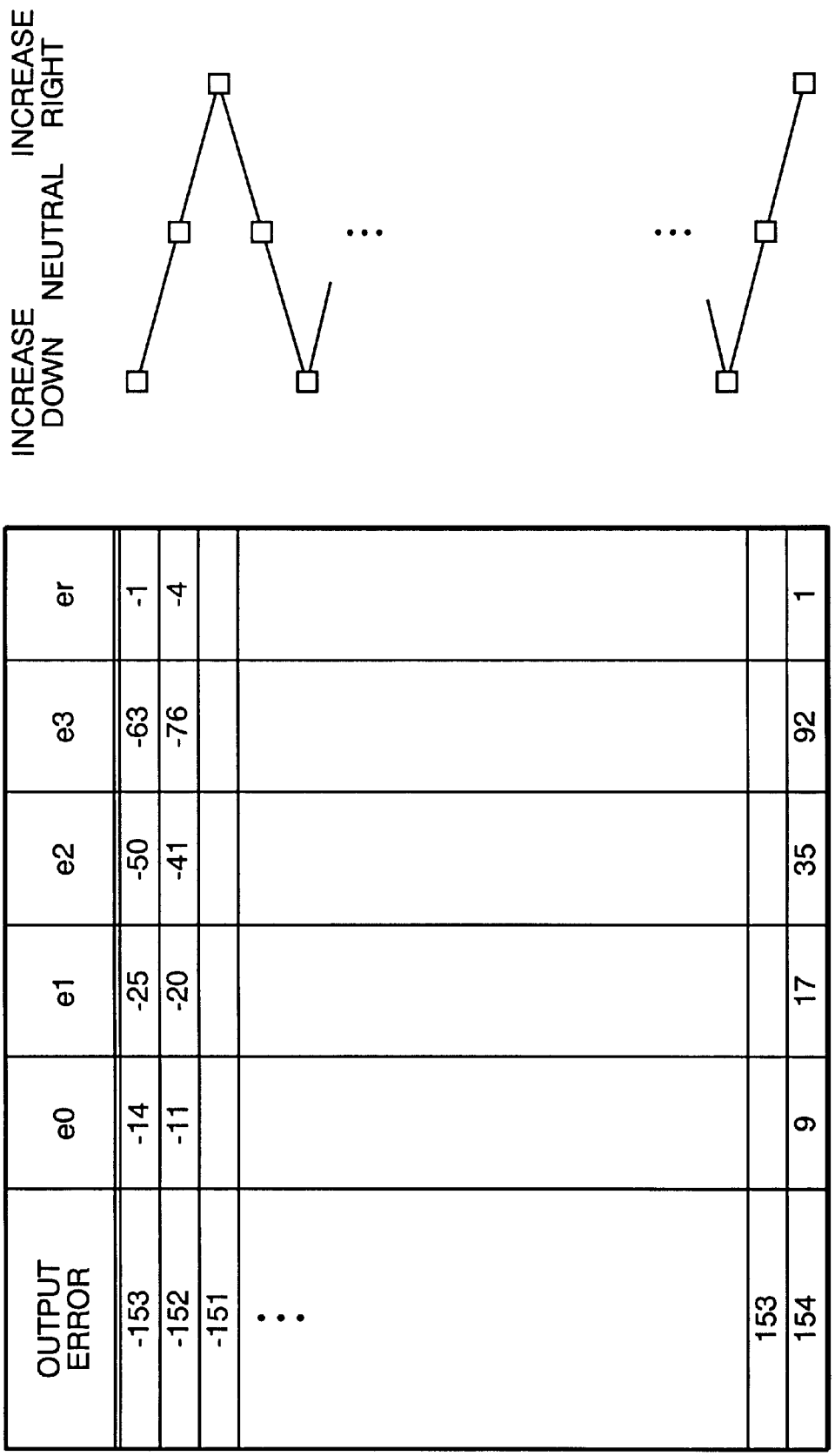
FIG. 12 is a view for explaining a look-up table in accordance with a further embodiment of the invention.

Referring specifically to FIG. 12, a look-up table is addressed by output error which varies between −153 and 154. At each output error, error diffusion values e0 through er are stored. The error diffusion values are obtained by apportioning the output error based on error diffusion coefficients such as the error diffusion coefficients shown in FIGS. 6A through 6C. As shown diagrammatically to the right of FIG. 12, the error diffusion coefficients are varied in accordance with output error, and preferably vary cyclically from an increase in error diffusion coefficients in the rightward direction (corresponding to FIG. 6B) through neutral error deficient coefficients (corresponding to FIG. 6A), to an increase in the downward left direction (corresponding to FIG. 6C) and so on. To obtain a fuller understanding of the look-up table shown in FIG. 12, one of the values, −153, will be examined more closely. Since −153 is of the form 4 m+3, the error diffusion coefficients shown in FIG. 6C are applicable. Applying those error coefficients to the output error of −153, the error diffusion values shown in FIG. 12 are obtained.

Reverting to FIG. 11, it is preferred that steps S1101 and S1102 are performed in advance of error diffusion halftoning, preferably at design time of printer driver 114. In this case, the error diffusion values can be stored in a look-up table in the print driver for distribution to end users. Alternatively, the look-up table can be dynamically calculated in advance of error diffusion halftonings, so as to be able to accommodate specific imaging conditions, such as conditions that might require variation in error diffusion coefficients to a greater or lesser degree.

Error diffusion halftoning of image data commences with step S1103 in which the image data value for a target pixel plus its accumulated error is accessed. Step S1104 determines the output print data for the target pixel based on the image data plus accumulated error for the target pixel, and thereafter determines the output error. Output error is the difference between the desired value for the target pixel (that is, the image data value plus accumulated error) and the actually output print data. Based on the output error, step S1105 accesses the look-up table to obtain error diffusion values. Steps S1106 adds the error diffusion values to adjacent pixels.

If all image data, or a sufficient portion such as a band thereof, have not yet been processed, step S1107 returns processing to step S1103 to complete error diffusion halftoning. On the other hand, as soon as all image data or a sufficient portion thereof has been error diffusion processed, flow advances to step S1108 in which printer driver 114 outputs the print data over bi-directional interface 106 from host processor 23 to printer 30 for printout thereby.

Figure 13:
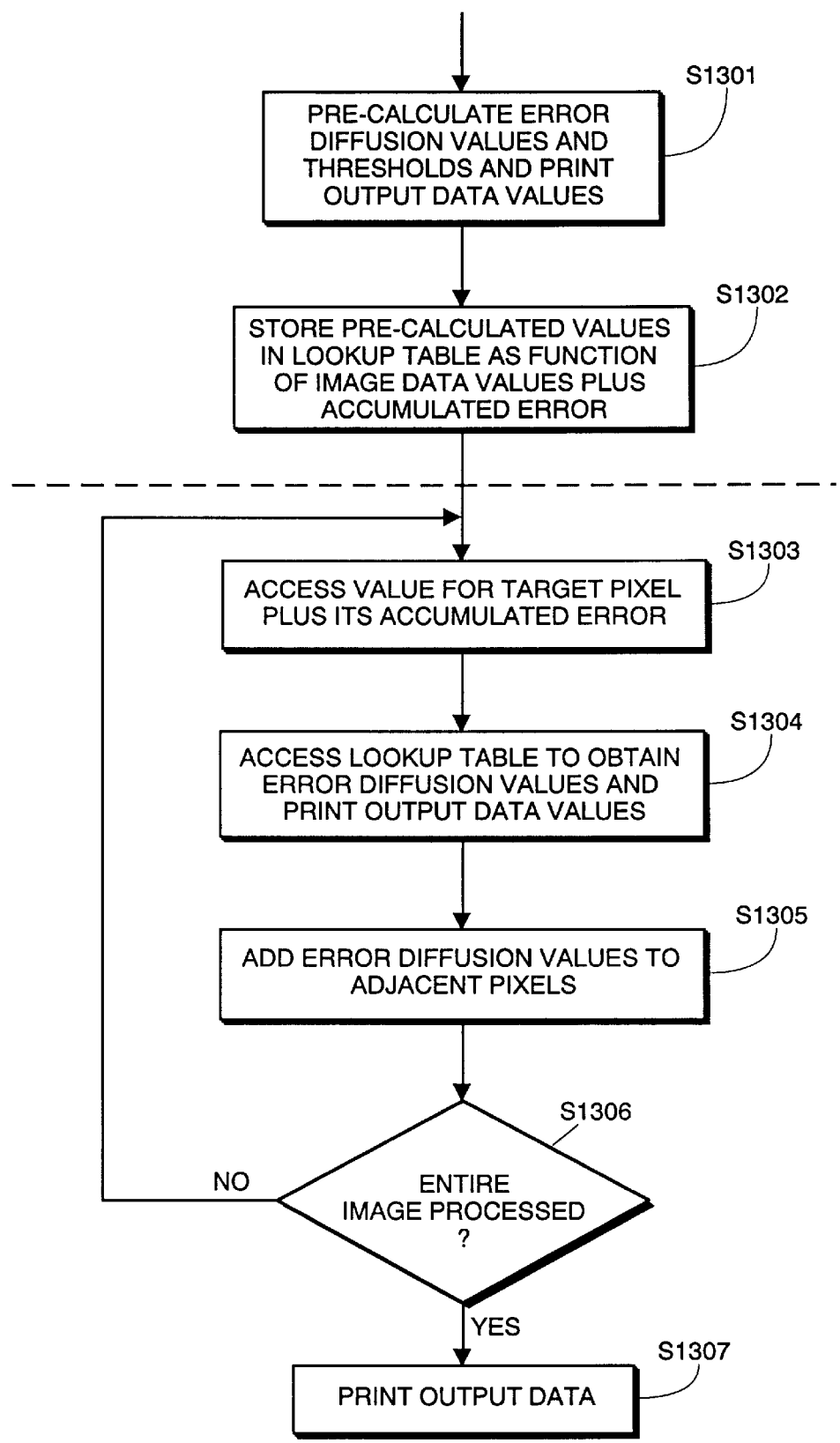
FIG. 13 is a flow diagram illustrating process steps according to a fifth embodiment of the invention.

FIG. 13 illustrates process steps according to a fifth embodiment of the invention. One way that the fifth embodiment differs from the third embodiment is that the error diffusion threshold varies based on image source data plus its accumulated error. Although it is possible to provide an embodiment of the invention in which only error diffusion thresholds vary, and error diffusion weights do not, it is preferable for both the error diffusion threshold and the error diffusion weights to vary; and in this fifth embodiment, both error diffusion weights and error diffusion thresholds vary. Variation of the error diffusion weights and the error diffusion thresholds are preferably cyclical variations, and further preferably cyclical variations with different periods. In this fifth embodiment, the cyclical variation of the error diffusion weights has a period of four, whereas the cyclical variation of error diffusion thresholds has a period of three. With cyclical variations having different periods, interference between the two periods can be lessened.

It is possible also to provide an embodiment in which variation of thresholds depends on output error, rather than on image source data plus accumulated error.

Generally speaking, the process steps of FIG. 13 provide for error diffusion halftoning through access to a look-up table that stores pre-calculated error diffusion values as well as printer output values, both pre-calculated as a function of image data values plus accumulated error. To halftone-process a target pixel, its value plus accumulated error is utilized to access the look-up table, thereby to obtain printer output values as well as error diffusion values. Error diffusion values obtained from the look-up table are thereafter added to adjacent pixels, for subsequent processing when adjacent pixels become the target pixel. The printer output value is stored for output to the printer.

Thus, step S1301 pre-calculates error diffusion values, thresholds, and printer output data values, for each possible value of source data plus its accumulated error. In the present embodiment, the error diffusion thresholds are allowed to vary cyclically ±25% around a nominal threshold of 128. In addition, the error diffusion weights are allowed to vary ±20% around nominal values. Accordingly, even though eight-bit image data is constrained to lie within a range of 0 through 255, the process of thresholding might result in an output error of as much as 25% more than −127, or up to 25% more than 128. The process of error accumulation might thereafter result in as much as a further 20 percent increase in both directions. Accordingly, error diffusion values and printer output values are calculated for each possible value of image source plus accumulated error in the range of −191 through 447.

FIG. 14A illustrates the cyclical nature of variation in error diffusion values and the cyclical nature of variation in thresholds. It is to be emphasized that FIG. 14A is for explanatory purposes only and is not representative of a look-up table (rather, FIG. 14B is representative of a look-up table). FIG. 14A shows how the error diffusion weights cycle, with a period of four, for each value of source image data plus accumulated error. In this fifth embodiment, the cyclical variations depicted in FIGS. 6A through 6C are used. In addition, FIG. 14A shows how the error diffusion threshold varies cyclically, with a period of three. When source image data plus accumulated error has the form 3 w, a threshold of 96 is assigned; when source image data plus accumulated error has the form 3 w+1, a threshold of 128 is assigned; and when source image data plus accumulated error has the form 3 w+2, a threshold of 160 is assigned. Such an arrangement provides for cyclical variation in threshold with a period that differs from that of the error diffusion weights.

Step S1302 stores pre-calculated values of error diffusion amounts and printer output data in a look-up table, with the pre-calculated values accessible as a function of source image data plus accumulated error. An illustrative example of a look-up table according to step S1302 is shown in FIG. 14B.

Referring to FIG. 14B, for each value of image source data plus accumulated error in the range of −191 through 447, error diffusion values e0, e1, e2, e3 and er are stored together with a printer output data value. The proportions used to obtain the error diffusion values depend on the source data plus accumulated error, as explained above in connection with FIG. 14A and using the weights shown in FIGS. 6A through 6C. The printer output value is obtained by a comparison of the source image data plus accumulated error against the cyclically varying threshold, as also explained above in connection with FIG. 14A.

For purposes of illustrating how steps S1301 and S1302 pre-calculate error diffusion amounts and a printer output value, and store such values in a look-up table, consider the situation presented when source image data plus its accumulated error is equal to 111, as shown in FIG. 14B. In such circumstances, the threshold is 96, which results in a printer output value of 1 (meaning print a dot). The difference between 111 and 255 (that is, the density value corresponding to a printed dot) results in an output error of −144. Diffusing the output error of −144 according to the error diffusion values shown in FIG. 6C yields the error diffusion values e0 through er shown at FIG. 14B.

Referring again to FIG. 13, it is preferred that steps S1301 and S1302 are performed in advance of error diffusion halftoning, preferably at design time of printer driver 114. In this case, the error diffusion values and the printer output values can be stored in a look-up table in the printer driver for distribution to end users. Alternatively, the look-up table can be dynamically calculated in advance of error diffusion halftoning, so as to be able to accommodate specific imaging conditions, such as conditions that might require variation in error diffusion coefficients or error thresholds to a greater or lesser degree.

Error diffusion halftoning of image data commences with step S1303 in which the image data for a target pixel plus its accumulated error is accessed. Step S1304 accesses the look-up table so as to obtain error diffusion values and the print output data value. Step S1305 adds error diffusion values to adjacent pixels. If all image data, or a sufficient portion thereof such as one band, has not yet been processed, then step S1306 returns processing to step S1303, until a sufficient portion or the entirety of the image data has been processed. When the entire image data or a sufficient portion thereof has been processed, then step S1307 causes the printer output data values to be transmitted from host processor 23 over bi-directional interface 106 to printer 30 for printout thereby.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. Error diffusion halftoning of image data for a target pixel comprising:
   determining a halftone output value for the target pixel based on a comparison between a threshold and the image data for the target pixel plus accumulated error; and
   diffusing error between the halftone output value and the image data plus accumulated error for the target pixel in predetermined proportions to image data of pixels adjacent the target pixel;
   wherein the predetermined proportions vary based at least in part on value of the output error.

2. Error diffusion halftoning of image data for a target pixel according claim 1, wherein the predetermined proportions vary cyclically based at least in part on output error.

3. Error diffusion halftoning of image data for a target pixel according to claim 2, wherein the predetermined proportions vary cyclically from proportions that favor error diffusion in a rightward direction, to proportions that favor error diffusion in a neutral direction, and to proportions that favor error diffusion in a lower left hand direction.

4. Error diffusion halftoning of image data for a target pixel according to claim 1, wherein in said determining step, the threshold is varied based at least in part on value of the output error.

5. Error diffusion halftoning of image data for a target pixel according to claim 4, wherein the threshold is varied cyclically.

6. Error diffusion halftoning of image data for a target pixel according to claim 5, wherein the cycle of the threshold differs from that of the predetermined proportions.

7. Error diffusion halftoning of image data for a target pixel comprising:
   determining a halftone output value for the target pixel based on a comparison between a threshold and the image data for the target pixel plus accumulated error; and
   diffusing error between the halftone output value and the image data plus accumulated error for the target pixel in predetermined proportions to image data of pixels adjacent the target pixel;
   wherein the predetermined proportions vary based at least in part on value of the image data plus accumulated error for the target pixel.

8. Error diffusion halftoning of image data for a target pixel according claim 7, wherein the predetermined proportions vary cyclically based at least in part on value of the image data plus accumulated error for the target pixel.

9. Error diffusion halftoning of image data for a target pixel according to claim 8, wherein the predetermined proportions vary cyclically from proportions that favor error diffusion in a rightward direction, to proportions that favor error diffusion in a neutral direction, and to proportions that favor error diffusion in a lower left hand direction.

10. Error diffusion halftoning of image data for a target pixel according to claim 7, wherein in said determining step, the threshold is varied based at least in part on value of the image data plus accumulated error for the target pixel.

11. Error diffusion halftoning of image data for a target pixel according to claim 10, wherein the threshold is varied cyclically.

12. Error diffusion halftoning of image data for a target pixel according to claim 11, wherein the cycle of the threshold differs from that of the predetermined proportions.

13. Error diffusion halftoning of image data for a target pixel comprising:
   accessing a look-up table that stores pre-calculated error diffusion amounts, wherein the pre-calculated error diffusion amounts are accessible based on input error plus accumulated error, and wherein error diffusion values in the look-up table are pre-calculated based on error diffusion coefficients that vary based at least in part on image data plus accumulated error;
   determining a halftone output value for the target pixel;
   accessing the look-up table using the image data plus accumulated error for the target pixel so as to obtain error diffusion amounts; and
   adding the error diffusion amounts to adjacent pixels.

14. Error diffusion halftoning of image data for a target pixel according to claim 13, wherein said step of determining a halftone output value for the target pixel is based on a comparison between a threshold and image data plus accumulated error for the target pixel.

15. Error diffusion halftoning of image data for a target pixel according to claim 13, wherein said look-up table further stores halftone output value, and wherein said step of determining halftone output value for the target pixel is based on a look-up of the halftone output value based on image data plus accumulated error for the target pixel.

16. Error diffusion halftoning of image data for a target pixel according to claim 13, wherein variation of error diffusion coefficients is cyclical across image data plus accumulated error.

17. Error diffusion halftoning of image data for a target pixel according to claim 16, wherein variation of error diffusion coefficients is cyclical so as to vary between error diffusion coefficients that are neutral, to error diffusion coefficients that favor error diffusion in a rightward direction, and error diffusion coefficients that favor error diffusion in a downward left direction.

18. Error diffusion halftoning of image data for a target pixel according to claim 13, wherein in said determining step, the threshold is varied based at least in part on value of the image data plus accumulated error for the target pixel.

19. Error diffusion halftoning of image data for a target pixel according to claim 18, wherein the threshold is varied cyclically.

20. Error diffusion halftoning of image data for a target pixel according to claim 19, wherein the cycle of the threshold differs from that of the predetermined proportions.

21. Error diffusion halftoning of image data for a target pixel comprising:

obtaining access to a look-up table that stores pre-calculated error diffusion amounts, wherein the pre-calculated error diffusion amounts are accessible from the look-up table based on output error, and wherein error diffusion amounts in the look-up table are pre-calculated based on error diffusion coefficients that vary based at least in part on output error;

determining a halftone output value for the target pixel;

calculating output error based on the difference between the halftone output value of the target pixel and image data plus accumulated error for the target pixel;

accessing the look-up table based on the output error so as to obtain error diffusion amounts for adjacent pixels; and adding the error diffusion amounts to adjacent pixels.

22. Error diffusion halftoning of image data for a target pixel according to claim 21, wherein variation of error diffusion coefficients is cyclical across image data plus accumulated error.

23. Error diffusion halftoning of image data for a target pixel according to claim 21, wherein variation of error diffusion coefficients is cyclical so as to vary between error diffusion coefficients that are neutral, to error diffusion coefficients that favor error diffusion in a leftward direction, and error diffusion coefficients that favor error diffusion in a lower rightward direction.

24. Error diffusion halftoning of image data for a target pixel according to claim 21, wherein in said determining step, the threshold is varied based at least in part on value of the output error.

25. Error diffusion halftoning of image data for a target pixel according to claim 24, wherein the threshold is varied cyclically.

26. Error diffusion halftoning of image data for a target pixel according to claim 25, wherein the cycle of the threshold differs from that of the predetermined proportions.

27. Error diffusion halftoning of image data for a target pixel comprising:

determining a halftone output value for the target pixel based on a comparison between a threshold and the image data for the target pixel plus accumulated error; and diffusing error between the halftone output value and the image data plus accumulated error for the target pixel in predetermined proportions to image data of pixels adjacent the target pixel;

wherein the threshold varies based at least in part on value of the output error.

28. Error diffusion halftoning of image data for a target pixel comprising:

determining a halftone output value for the target pixel based on a comparison between a threshold and the image data for the target pixel plus accumulated error; and diffusing error between the halftone output value and the image data plus accumulated error for the target pixel in predetermined proportions to image data of pixels adjacent the target pixel;

wherein the threshold varies based at least in part on value of the image data plus accumulated error for the target pixel.

29. Error diffusion halftoning of image data for a target pixel comprising:

accessing a look-up table that stores halftone output values as a function of image data plus accumulated error, wherein the halftone output values are pre-calculated using thresholds that vary based at least in part on image data plus accumulated error;

accessing the look-up table using the image data plus accumulated error for the target pixels so as to obtain halftone output value for the target pixel; and diffusing output error between the image data plus accumulated error for the target pixel and the halftone output value to adjacent pixels.

30. Error diffusion halftoning of image data for a target pixel comprising:

accessing a look-up table that stores halftone output values as a function of image data plus accumulated error, wherein the halftone output values are pre-calculated using thresholds that vary based at least in part on output error;

accessing the look-up table using the image data for the target pixels so as to obtain halftone output value for the target pixel; and diffusing output error between the image data for the target pixel and the halftone output value to adjacent pixels.

31. Error diffusion halftoning of image data for a target pixel comprising:

determining a halftone output value for the target pixel based on a comparison between a threshold and the image data for the target pixel plus accumulated error; and diffusing error between the halftone output value and the image data plus accumulated error for the target pixel in predetermined proportions to image data of pixels adjacent the target pixel;

wherein the predetermined proportions vary based at least in part on value of the output error, wherein, in said determining step, the threshold is varied based at least in part on value of the output error, and wherein the threshold is varied cyclically.

32. Error diffusion halftoning of image data for a target pixel according to claim 31, wherein the cycle of the threshold differs from that of the predetermined proportions.

33. Error diffusion halftoning of image data for a target pixel comprising:

determining a halftone output value for the target pixel based on a comparison between a threshold and the image data for the target pixel plus accumulated error; and diffusing error between the halftone output value and the image data plus accumulated error for the target pixel in predetermined proportions to image data of pixels adjacent the target pixel;

wherein the predetermined proportions vary based at least in part on value of the image data plus accumulated error for the target pixel, wherein, in said determining step, the threshold is varied based at least in part on value of the image data plus accumulated error for the target pixel, and wherein the threshold is varied cyclically.

34. Error diffusion halftoning of image data for a target pixel according to claim 33, wherein the cycle of the threshold differs from that of the predetermined proportions.

35. Error diffusion halftoning of image data for a target pixel comprising:

accessing a look-up table that stores pre-calculated error diffusion amounts, wherein the pre-calculated error diffusion amounts are accessible based on input error plus accumulated error, and wherein error diffusion values in the look-up table are pre-calculated based on error diffusion coefficients that vary based at least in part on image data plus accumulated error;

determining a halftone output value for the target pixel;

accessing the look-up table using the image data plus accumulated error for the target pixel so as to obtain error diffusion amounts;

adding the error diffusion amounts to adjacent pixels, and wherein, in said determining step, the threshold is varied based at least in part on value of the image data plus accumulated error for the target pixel and wherein the threshold is varied cyclically.

36. Error diffusion halftoning of image data for a target pixel according to claim 35, wherein the cycle of the threshold differs from that of the predetermined proportions.

37. Error diffusion halftoning of image data for a target pixel comprising:

obtaining access to a look-up table that stores pre-calculated error diffusion amounts, wherein the pre-calculated error diffusion amounts are accessible from the look-up table based on output error, and wherein error diffusion amounts in the look-up table are pre-calculated based on error diffusion coefficients that vary based at least in part on output error;

determining a halftone output value for the target pixel;

calculating output error based on the difference between the halftone output value of the target pixel and image data plus accumulated error for the target pixel;

accessing the look-up table based on the output error so as to obtain error diffusion amounts for adjacent pixels;

adding the error diffusion amounts to adjacent pixels, and wherein in said determining step, the threshold is varied based at least in part on value of the output error and wherein the threshold is varied cyclically.

38. Error diffusion halftoning of image data for a target pixel according to claim 37, wherein the cycle of the threshold differs from that of the predetermined proportions.

* * * * *

UNITED STATES PATENT AND TRADEMARK OFFICE
CERTIFICATE OF CORRECTION

PATENT NO.    : 6,172,768 B1  
DATED         : January 9, 2001  
INVENTOR(S)   : Akitoshi Yamada et al.

Page 1 of 1

It is certified that error appears in the above-identified patent and that said Letters Patent is hereby corrected as shown below:

<u>Title page,</u>  
Item [56], References Cited, insert -- OTHER PUBLICATIONS  
R. Eschbach, "Reduction of artifacts in error diffusion by means of input-dependent weights", Journal of Electronic Imaging, October 1993, Vol. 2, No. 4, pp. 352-258.  
R. Eschbach, et al. "Error-diffusion algorithm with edge enhancement", Journal of Optical Society of America, Vol. 8, No. 12, December 1991, pp. 1844-1850. --.

ABSTRACT,  
Line 4, "is" should read -- are --.

<u>Column 2,</u>  
Line 59, "very" should read -- vary, --.

<u>Column 6,</u>  
Line 16, "61*a*and" should read -- 61*a* and --.

<u>Column 8,</u>  
Line 10, "4 m+3." should read -- 4m + 3. --.  
Line 42, "s506" should read -- S506 --.

<u>Column 14,</u>  
Line 12, "according" should read -- according to --.

Signed and Sealed this

Twenty-eighth Day of May, 2002

*Attest:*

JAMES E. ROGAN  
*Attesting Officer*     *Director of the United States Patent and Trademark Office*